United States Patent [19]

Wang et al.

[11] Patent Number: 5,116,126
[45] Date of Patent: May 26, 1992

[54] INTERFEROMETER REQUIRING NO CRITICAL COMPONENT ALIGNMENT

[75] Inventors: Charles C. P. Wang, Rancho Palos Verdes; Joe S. B. Zhou, Monterey Park, both of Calif.

[73] Assignee: Optodyne, Inc., Compton, Calif.

[21] Appl. No.: 638,381

[22] Filed: Jan. 7, 1991

[51] Int. Cl.$^5$ .............................................. G01B 9/02
[52] U.S. Cl. ..................................... 356/349; 356/358
[58] Field of Search ................ 356/349, 358, 359, 360

[56] References Cited

U.S. PATENT DOCUMENTS 3,796,495  3/1974  Laub ..................................... 356/349
4,466,738  8/1984  Huang et al. ......................... 356/349

Primary Examiner—Samuel A. Turner

[57] ABSTRACT

A Michelson-type self-aligning interferometer utilizes a laser to produce an output beam of light that is split into signal and reference beams. The signal beam is directed through a Bragg-cell, for heterodyne detection, and a beam expander, for facilitating target acquisition, toward a retroreflector located on a target body. The signal beam is thereby reflected back through the beam expander and Bragg-cell toward the resonance mirror of the laser, and is now shifted in frequency by $2\Omega$. The returning signal beam remains co-linear with the output beam since it returns over the same path and through the same optical elements, especially the laser resonance mirror. Thus, the interferometer can accommodate a significant amount of component misalignment without loss of operation. The signal beam, once reflected from the resonance mirror of the laser and partially reflected by the beam splitter, is co-linear with the reference beam. The signal beam and reference beam are directed into a detector to produce an electrical signal. A frequency divider and a phase demodulator extract the phase of the electrical signal through heterodyne detection, the phase being proportional to the position of the retroreflector and, hence, the target body.

9 Claims, 1 Drawing Sheet

INTERFEROMETER REQUIRING NO CRITICAL COMPONENT ALIGNMENT

FIELD OF THE INVENTION

This invention relates to self-referencing interferometers. More particularly, this invention relates to a Michelson-type self-referencing interferometer that utilizes a laser resonator mirror to achieve self-alignment.

BACKGROUND OF THE INVENTION

Michelson interferometers have been used, in various devices, for the measurement of displacement, spatial non-uniformity, angle, and polarization states of various reflecting bodies. Typical Michelson interferometer devices utilize a gas laser to produce a beam of monochromatic light which is then split into signal and reference beams. The signal beam is transmitted to and then reflected from a target body. The signal and reference beams are recombined in the device into a composite, co-linear beam. The difference in phase between the two beams creates an interference pattern, or fringe pattern, in the composite beam which is extremely sensitive to change in the position of the target body. Hence, information about the dynamics of a target body can be determined by study of the dynamics of the interference pattern.

In such interferometer devices, the signal and reference beams must be precisely re-aligned into a linear composite beam in order to maximize the signal-to-noise ratio, or contrast, of the interference pattern. Current interferometer designs require precision optical components and extremely stable mechanical structures to achieve this precise alignment. Moreover, such designs utilize more components than necessary, thereby increasing the complexity and reducing the reliability of the devices. As a result, such interferometer devices are relatively expensive to manufacture, calibrate, and maintain.

One difficulty with the Michealson interferometer is the problem of keeping the reference and the signal light beams in exact parallel and colinear alignment. This is required in order to obtain the highest contrast or signal-to-noise ratio. Even with good initial alignment, small vibrations or temperature changes can result in distortion or beam shifting resulting in beam misalignment. The present invention uses an adaptive method such that any small shift or movement of the optical components is of little importance. That is, the reference beam and signal beam will remain colinear over small movements or rotations of the optical components.

For example, in the original Michealson device, two flat mirrors and a beam splitter are used. The alignment of these optical components is very critical. Any small rotation of a flat mirror can cause the two beams to diverge. Improvement can be made by replacing the two flat-mirrors by two corner-cubes which will reflect light back at exactly the same angle even if the corner-cube is rotated slightly. In this way, the alignment of the two reflectors in the Michealson interferometer becomes less critical. However, the alignment of the beam splitter is still very critical. Any small rotation of the beam splitter will cause the reference beam and the signal beam to become divergent.

The present invention solves this problem by using the laser output mirror as part of the interferometer to combine the reference and signal beams. As shown in FIG. 1, by using a corner cube as the means for reflecting the source beam, and the output mirror of the laser itself for steering the reflected beam to the splitter, the two beams must always be colinear even if the splitter is rotated over a small angle.

There is a need for an improved interferometer device that contains a minimal number of components, fewer of which require extreme precision or extremely stable mechanical structures. The present invention fulfills these needs and provides further related advantages.

SUMMARY OF THE INVENTION

The present invention is a Michelson interferometer that utilizes a resonator mirror of a laser to precisely align a returning signal beam with a reference beam. A gas laser produces an output beam which is split by a standard beam splitting device into a reference beam and a signal beam. The reference beam is directed into a detector. For subsequent heterodyne detection, the signal beam is transmitted to a Bragg-cell that shifts the frequency of the signal beam by $\Omega$ and the direction of the signal beam by $\theta$. The signal beam is then directed toward a retroreflector attached to the target, whereby the signal beam is reflected back in the opposite direction. This reflected signal beam enters the Bragg-cell, again being shifted in frequency by $\Omega$ and in direction by $-\theta$. As a result, the reflected signal beam is parallel with, but opposite in direction to, the output beam, and its frequency is shifted by $2\Omega$.

The reflected signal beam is then partially transmitted through the beam splitter to the resonance mirror of the laser, whereby it is again reflected into the beam splitter and directed into the detector, co-linear with the reference beam but frequency shifted by $2\Omega$ plus phase information. The detector produces an output signal with an output frequency, and a frequency divider divides this output frequency by 2. A phase-demodulator is used to obtain the phase $\phi$ of the output, $\phi$ being directly proportional to the position of the retroreflector on the target body. Information processing means utilize $\phi$ to determine dynamic characteristics of the target body in this manner.

This device achieves self-alignment of the reference beam and the reflected signal beam since both beams are perpendicular to the resonance mirror of the laser. Hence, no adjustment of the beam splitter, the laser, or the laser resonance mirror is necessary. Moreover, this device does not require a reference mirror, further simplifying its manufacture, calibration, maintenance, and use. Other features and advantages of the present invention will become apparent from the following more detailed description, taken in conjunction with the accompanying drawings, which illustrate, by way of example, the principles of the invention.

DESCRIPTION OF THE DRAWINGS

The accompanying drawing illustrates the invention. In such drawing:

DETAILED DESCRIPTION OF THE PREFERRED EMBODIMENT

Figure 1:
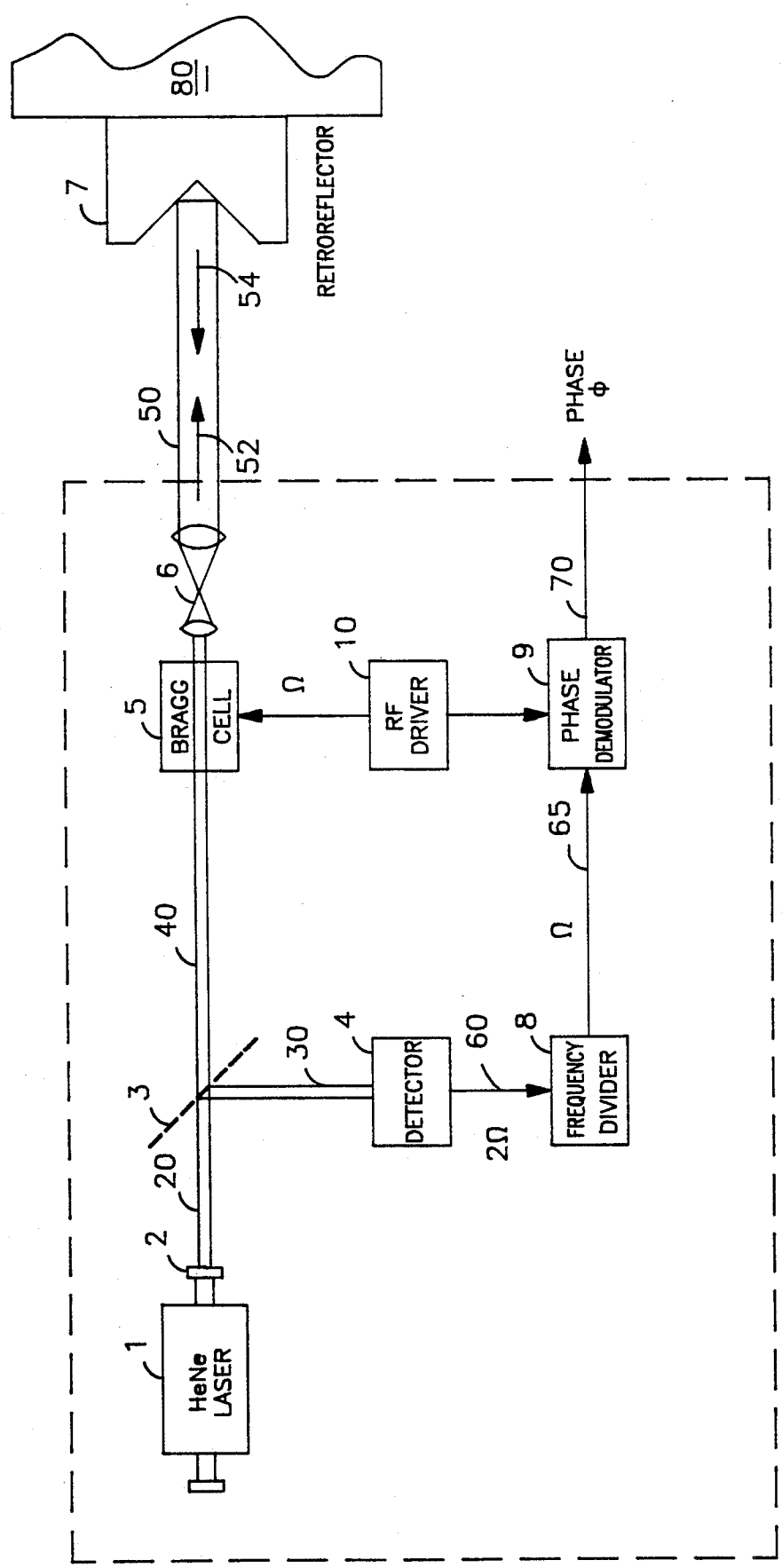
FIG. 1 is a schematic diagram of the invention, illustrating the components and the light and signal paths of the invention.

FIG. 1 illustrates a Michelson type self-aligning interferometer. A gas laser 1, preferably a helium-neon laser, has a mirror 2 and produces an output beam 20. A splitting means 3 splits the output beam 20 into spatially separated first beam 30 and second beam 40. The second beam 40 is directed into a frequency and direction shifting means 5, preferably a Bragg-cell for heterodyne detection, whereby the second beam 40 is shifted in frequency by $\Omega$ and in direction by $\theta$. Preferably, the second beam 40 is then directed into a beam expander 6 for providing beam broadening and improved collimation of the second beam 40 to improve beam acquisition of a reflecting means 7, preferably a retroreflector, located on a target body 80.

The second beam 40, emerging from the beam expander 6, is directed along a path 50 while traveling in a first direction 52 towards the reflecting means 7, whereby the second beam 40 is reflected back along the path 50 but in the opposite direction 54 from that of the first direction 52. The second beam 40 then re-enters the beam expander 6 which, from the opposite direction 54, acts as a beam reducer. The second beam 40 is again directed through the frequency and direction shifting means 5, but from the opposite direction 54, whereby the frequency of the beam is again shifted by $\Omega$ and the direction of the beam is shifted by $-\theta$. The resulting second beam 40 is parallel with the output beam 20, but opposite in direction, and is directed through the beam splitting means 3 toward the mirror 2 of the gas laser 1. The second beam 40 is then reflected from the mirror 2 and partially reflected from the beam splitting means 3 into a detecting means 4, preferably a photo-detector or, alternatively, an array detector or television camera. The first beam 30 is similarly directed into the detecting means 4, and is precisely aligned with the returning second beam 40.

The detecting means 4 for detecting the first beam 30 and the returning second beam 40 is electrically connected to a frequency divider 8 which, in turn, is electrically connected to a phase demodulator 9. The detecting means 4 produces an electrical signal 60 which has a frequency of $2\Omega$ plus the phase information 70, and the frequency divider 8 divides the frequency of the electrical signal 60 by 2, thereby producing a half-frequency electrical signal 65 which the phase demodulator 9 reduces to the phase information 70. This phase information 70 is directly proportional to the position of the reflecting means 7, and as a result can be used to determine information about the length of the path 50.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. An interferometer requiring no critical component alignment, comprising:
    a gas laser for producing an output light beam, the laser having an output mirror;
    means for splitting the output light beam into two spatially separated components, the components being a first beam and a second beam;
    means for detecting the first and the second beams, the first beam being directed by the splitting means directly to the detector for use as a reference;
    means for frequency and direction shifting, the second beam being directed by the splitting means to the shifting means, and therein being frequency and direction shifted;
    means for reflecting, the second beam being directed by the shifting means to the reflecting means, such that the second beam is reflected back to the shifting means and therein being frequency shifted a second time and direction shifted such that the second beam is directed along the path of the output light beam, being colinear thereto, so that the reflected second beam impinges the laser source output mirror and is reflected therefrom toward the splitter, a portion of the twice reflected second beam being colinear with the first beam and directed to the detector therewith, the reflected second light beam, being frequency shifted from the laser frequency therefore not destabilizing the laser upon entry through the output mirror, whereby the stability of the splitter position is not highly critical to the proper operation of the interferometer.

2. The interferometer of claim 1 further including a phase demodulator for receiving an electrical signal, the signal corresponding to the detected light beams, for phase demodulating the signal to produce beam path length information.

3. The interferometer of claim 1 further including a beam expander for broadening and improving collimation of the second beam such that the acquisition of the second beam by the reflecting means is improved.

4. The interferometer of claim 1 wherein the reflecting means is a retroreflector, so that the alignment stability of the shifting means is not highly critical.

5. The interferometer of claim 1 wherein the means for frequency and direction shifting is a Bragg-cell.

6. The interometer of claim 1 wherein the means for detecting is a photo-detector.

7. The interferometer of claim 1 wherein the means for detecting is an array detector.

8. The interferometer of claim 1 wherein the means for detecting is a television camera.

9. A method for interferometric measurement in which the alignment stability of the elements of apparatus is not highly critical, comprising the steps:
    providing a gas laser having an output mirror, a beam splitter, a means for frequency and direction shifting, a retroreflector target, a means for detecting, and a means for phase demodulation;
    producing an output light beam from the laser;
    splitting the output light beam into a first and a second beams at the beam splitter;
    detecting the first beam at the detecting means;
    frequency and direction shifting the second beam at the shifting means;
    reflecting the second beam at the retroreflector back to the shifting means;
    frequency and direction shifting the second beam at the shifting means for a second time;
    reflecting the second beam at the output mirror back to the beam splitter;
    detecting the second beam at the detecting means for producing a corresponding electrical signal;
    phase demodulating the electrical signal to acquire path length information.

* * * * *